United States Patent
Langlotz et al.

(10) Patent No.: US 9,153,073 B2
(45) Date of Patent: Oct. 6, 2015

(54) SPATIALLY REGISTERED AUGMENTED VIDEO

(71) Applicant: QUALCOMM Incorporated, San Diego, CA (US)

(72) Inventors: Tobias Martin Langlotz, Graz (AT); Mathaus Zingerle, Vienna (AT); Gerhard Reitmayr, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 13/802,065

(22) Filed: Mar. 13, 2013

(65) Prior Publication Data

US 2013/0314442 A1    Nov. 28, 2013

Related U.S. Application Data

(60) Provisional application No. 61/650,882, filed on May 23, 2012.

(51) Int. Cl.
  *G09G 5/00*    (2006.01)
  *G06T 19/00*   (2011.01)
  *H04N 5/232*   (2006.01)
  *G06T 11/00*   (2006.01)

(52) U.S. Cl.
  CPC .............. *G06T 19/006* (2013.01); *G06T 11/00* (2013.01); *H04N 5/23238* (2013.01)

(58) Field of Classification Search
  USPC .................................................. 345/619, 633
  See application file for complete search history.

(56) References Cited

U.S. PATENT DOCUMENTS 5,495,576 A * 2/1996 Ritchey .......................... 345/420
5,850,352 A * 12/1998 Moezzi et al. ................. 345/419
6,278,466 B1 * 8/2001 Chen ............................. 345/473

(Continued)

FOREIGN PATENT DOCUMENTS

| WO | 2005088539 A2 | 9/2005 |
| WO | 2011063034 A1 | 5/2011 |
| WO | 2011106520 A1 | 9/2011 |

OTHER PUBLICATIONS

"Action Shot", Mar. 20, 2012, XP055082179, Retrieved from the Internet : URL: http://en.wikipedia.org/w/index.php?title=ActionShot&oldid=482983078 [retrieved on Oct. 2, 2013] the whole document.
International Search Report and Written Opinion—PCT/US2013/038251, International Search Authority—European Patent Office, Oct. 15, 2013.

(Continued)

*Primary Examiner* — M Good Johnson
(74) *Attorney, Agent, or Firm* — Silicon Valley Patent Group LLP

(57) ABSTRACT

A source video stream is processed to extract a desired object from the remainder of video stream to produce a segmented video of the object. Additional relevant information, such as the orientation of the source camera for each frame in the resulting segmented video of the object, is also determined and stored. During replay, the segmented video of the object, as well as the source camera orientation are obtained. Using the source camera orientation for each frame of the segmented video of the object, as well as target camera orientation for each frame of a target video stream, a transformation for the segmented video of the object may be produced. The segmented video of the object may be displayed over the target video stream, which may be a live video stream of a scene, using the transformation to spatially register the segmented video to the target video stream.

37 Claims, 9 Drawing Sheets

(56) References Cited

U.S. PATENT DOCUMENTS

| | | | | |
|---|---|---|---|---|
| 6,356,297 | B1* | 3/2002 | Cheng et al. | 348/36 |
| 6,654,414 | B1* | 11/2003 | Narayanaswami | 375/240.01 |
| 7,106,335 | B2* | 9/2006 | Chevallier et al. | 345/474 |
| 7,595,833 | B2* | 9/2009 | Calisa | 348/333.01 |
| 7,630,571 | B2 | 12/2009 | Cutler et al. | |
| 8,933,986 | B2* | 1/2015 | Schall et al. | 348/37 |
| 2004/0062439 | A1* | 4/2004 | Cahill et al. | 382/173 |
| 2007/0269108 | A1* | 11/2007 | Steinberg et al. | 382/173 |
| 2008/0181507 | A1* | 7/2008 | Gope et al. | 382/190 |
| 2011/0221656 | A1 | 9/2011 | Haddick et al. | |
| 2011/0250962 | A1 | 10/2011 | Feiner et al. | |
| 2012/0113142 | A1 | 5/2012 | Adhikari et al. | |
| 2012/0176516 | A1 | 7/2012 | Elmekies | |
| 2012/0194547 | A1* | 8/2012 | Johnson et al. | 345/632 |
| 2012/0236029 | A1 | 9/2012 | Newhouse et al. | |
| 2012/0249741 | A1 | 10/2012 | Maciocci et al. | |
| 2012/0293610 | A1* | 11/2012 | Doepke et al. | 348/36 |
| 2012/0294549 | A1* | 11/2012 | Doepke | 382/294 |
| 2013/0002649 | A1* | 1/2013 | Wu et al. | 345/419 |

OTHER PUBLICATIONS

Mikulastik P.A: "Schatzung von Mosaikbildern aus einer Kamerabilalfolge" In: "Schatzung von Mosaikbildern aus einer Kamerabilalfolge", Jul. 18, 2001, Institut fur theoretische Nachrichtentechnik and Informationsverarbeitung, Universitat Hannover, Hannover, Germany, XP055081962, p. 46-p. 47 p. 27 p. 11-p. 15.

Partial International Search Report—PCT/US2013/038251—ISA/EPO—Aug. 8, 2013.

Rother C. et al., "'GrabCut'—Interactive Foreground Extraction using Iterated Graph Cuts," ACM Transactions on Graphics (SIGGRAPH'04), Aug. 2004, 6 pages.

Wagner D. et al., "Real-time Panoramic Mapping and Tracking on Mobile Phones," 2010 IEEE Virtual Reality Conference (VR), Mar. 2010, pp. 211-218.

Langlotz, et al., "AR Record&Replay: Situated Compositing of Video Content in Mobile Augmented Reality", Proceedings of OzCHI (Australian Computer-Human Interaction Conference), ACM Press, 2012, 9 pgs.

* cited by examiner

SPATIALLY REGISTERED AUGMENTED VIDEO

CROSS-REFERENCE TO RELATED APPLICATION(S)

This application claims priority under 35 USC 119 to U.S. Provisional Application No. 61/650,882, filed May 23, 2012, and entitled "Augmented Video: Implementing Situated Video Augmentations In Panorama-Based AR Applications" which is incorporated herein in its entirety by reference.

BACKGROUND

1. Background Field

Embodiments of the subject matter described herein are related generally to augmented reality, and more particularly to augmenting a current display of a real world environment with a pre-recorded video of an object.

2. Relevant Background

The availability of inexpensive mobile video recorders and the integration of high quality video recording capabilities into smartphones have tremendously increased the amount of videos being created and shared online. With the amount of video that is uploaded and viewed each day, new ways to search, browse and experience video content are highly relevant. Current user interfaces of online video tools, however, mostly replicate the existing photo interfaces. Features such as geo-tagging or browsing geo-referenced content in a virtual globe application have been mainly reproduced for video content.

More recently, efforts have been made to explore the spatial-temporal aspect of videos. For example, some applications allow end-users to experience multi-viewpoint events recorded by multiple cameras. Such applications allow transitions between camera viewpoints and offer a flexible way to browse and create video montages captured from multiple perspectives. These applications, however, are limited to producing and exploring video content on desktop user interfaces (e.g. web, virtual globe) out of the real context.

SUMMARY

A source video stream is processed to extract a desired object from the remainder of the video stream to produce a segmented video of the object. Additional relevant information, such as the orientation of the source camera for each frame in the resulting segmented video of the object, is also determined and stored. During replay, the segmented video of the object, as well as the source camera orientation are obtained. Using the source camera orientation for each frame of the segmented video of the object, as well as target camera orientation for each frame of a target video stream, a transformation for the segmented video of the object may be produced. The segmented video of the object may be displayed over the target video stream, which may be a live video stream of a scene, using the transformation to spatially register the segmented video to the target video stream.

In one implementation, a method includes obtaining a plurality of segmented image frames of an object and an orientation of a source camera for each frame in the plurality of segmented image frames, the plurality of segmented image frames of the object captured with the source camera; causing a plurality of target image frames to be captured with a target camera; determining an orientation of the target camera for each frame of the plurality of target image frames; calculating a transformation for each frame of the plurality of segmented image frames of the object using the orientation of the source camera for each frame in the plurality of segmented image frames and the orientation of the target camera for each respective frame in the plurality of target image frames; and causing the plurality of segmented image frames to be displayed over the plurality of target image frames using the transformation for each frame.

In one implementation, a mobile device includes a camera capable of capturing a plurality of target image frames; a display capable of displaying the plurality of target image frames; and a processor coupled to the camera and the display, the processor configured to obtain a plurality of segmented image frames of an object and an orientation of a source camera for each frame in the plurality of segmented image frames, the plurality of segmented image frames of the object captured with the source camera; determine an orientation of the camera for each frame of the plurality of target image frames; calculate a transformation for each frame of the plurality of segmented image frames of the object using the orientation of the source camera and the orientation of the camera; and display the plurality of segmented image frames of the object over the plurality of target image frames on the display using the transformation for each frame.

In one implementation, a mobile device includes means for obtaining a plurality of segmented image frames of an object and an orientation of a source camera for each frame in the plurality of segmented image frames, the plurality of segmented image frames of the object captured with the source camera; means for capturing a plurality of target image frames with a target camera; means for determining an orientation of the target camera for each frame of the plurality of target image frames; means for calculating a transformation for each frame of the plurality of segmented image frames of the object using the orientation of the source camera and the orientation of the target camera; and means for displaying the plurality of segmented image frames of the object over the plurality of target image frames using the transformation for each frame.

In one implementation, a non-transitory computer-readable medium including program code stored thereon, includes program code to obtain a plurality of segmented image frames of an object and an orientation of a source camera for each frame in the plurality of segmented image frames, the plurality of segmented image frames of the object captured with the source camera; program code to determine an orientation of a target camera for each frame of a plurality of target image frames captured with the target camera; program code to calculate a transformation for each frame of the plurality of segmented image frames of the object using the orientation of the source camera and the orientation of the target camera; and program code to display the plurality of segmented image frames of the object over the plurality of target image frames using the transformation.

In one implementation, a method includes obtaining a plurality of source image frames including an object that is captured with a moving camera; segmenting the object from the plurality of source image frames to produce a plurality of segmented image frames of the object; determining an orientation of the moving camera for each frame of the plurality of segmented image frames of the object; and storing the plurality of segmented image frames of the object and the orientation of the moving camera for each frame of the plurality of segmented image frames of the object.

In one implementation, an apparatus includes a database; and a processor coupled to the database, the processor being configured to obtain a plurality of source image frames including an object that is captured with a moving camera, segment the object from the plurality of source image frames to produce a plurality of segmented image frames of the object; determine an orientation of the moving camera for each frame of the plurality of segmented image frames of the object, and store the plurality of segmented image frames of the object and the orientation of the moving camera for each frame of the plurality of segmented image frames of the object in the database.

In one implementation, an apparatus includes means for obtaining a plurality of source image frames including an object that is captured with a moving camera; means for segmenting the object from the plurality of source image frames to produce a plurality of segmented image frames of the object; means for determining an orientation of the moving camera for each frame of the plurality of segmented image frames of the object; and means for storing the plurality of segmented image frames of the object and the orientation of the moving camera for each frame of the plurality of segmented image frames of the object.

In one implementation, a non-transitory computer-readable medium including program code stored thereon, includes program code to obtain a plurality of source image frames including an object that is captured with a moving camera; program code to segment the object from the plurality of source image frames to produce a plurality of segmented image frames of the object; program code to determine an orientation of the moving camera for each frame of the plurality of segmented image frames of the object; and program code to store the plurality of segmented image frames of the object and the orientation of the moving camera for each frame of the plurality of segmented image frames of the object.

DETAILED DESCRIPTION

Figure 1:
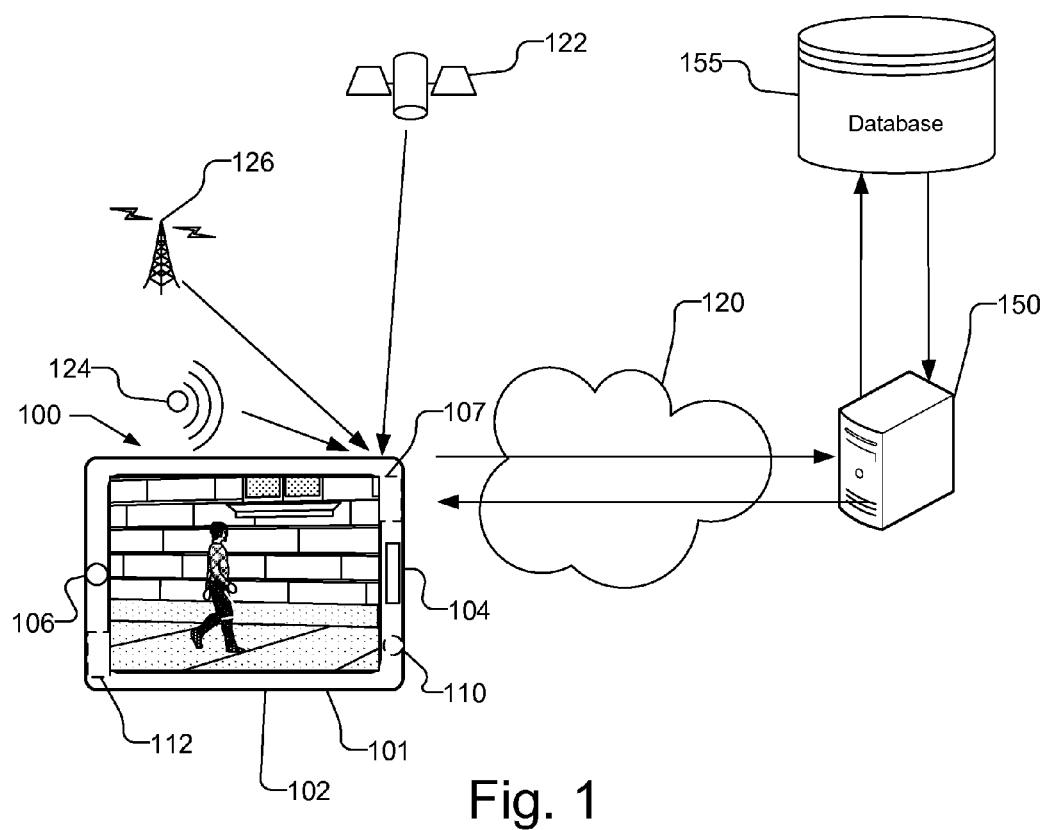
FIG. 1 illustrates a block diagram showing a system including a mobile device capable of displaying pre-recorded video content spatially registered on a live view of the real world.

FIG. 1 illustrates a block diagram showing a system including a mobile device 100 capable of displaying pre-recorded video content spatially registered on a live view of the real world, e.g., as an augmented reality application. The mobile device 100 may also capture and/or generate the pre-recorded video content that may be later displayed, spatially registered to a live view of the real world, e.g., by the mobile device 100 or another device. As illustrated in FIG. 1, the system may include a server 150 and database 155, which are capable of producing and storing the pre-recorded video content, which may be obtained by the mobile device 100, e.g., through network 120.

FIG. 1 illustrates the front side of the mobile device 100 as including a housing 101, a display 102, which may be a touch screen display, as well as a speaker 104 and microphone 106. The display 102 of the mobile device 100 illustrates a frame of video of a scene that includes an object 252, illustrated as a walking person, that is captured with a forward facing camera 110. The object 252 may be present in the real world scene that is video recorded by the mobile device 100, e.g., where the mobile device is capturing the video content to be processed and later provided for video augmentation. Alternatively, the object 252 is not present in the real world scene, but is pre-recorded video content that is spatially registered and displayed over a live video stream of the real world scene that is captured by the mobile device.

The mobile device 100 may further include sensors 112, such as one or more of a magnetometer, gyroscopes, accelerometers, etc. The mobile device 100 is capable of determining its position using conventional positioning techniques, such as using receiver 107 to obtain a GPS measurement using satellite positioning system (SPS) 122, or trilateration using wireless sources such as access points 124 or cellular towers 126. An SPS system 122 of transmitters is positioned to enable entities to determine their location on or above the Earth based, at least in part, on signals received from the transmitters. In a particular example, such transmitters may be located on Earth orbiting satellite vehicles (SVs), e.g., in a constellation of Global Navigation Satellite System (GNSS) such as Global Positioning System (GPS), BeiDou Navigation Satellite System (BDS), Galileo, Glonass or Compass or other non-global systems. Thus, as used herein an SPS may include any combination of one or more global and/or regional navigation satellite systems and/or augmentation systems, and SPS signals may include SPS, SPS-like (for example, from a pseudolite), and/or other signals associated with such one or more SPS.

As used herein, a "mobile device" refers to any portable electronic device such as a cellular or other wireless communication device, personal communication system (PCS) device, personal navigation device (PND), Personal Information Manager (PIM), Personal Digital Assistant (PDA), or other suitable mobile device. The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all electronic devices, including wireless communication devices, computers, laptops, tablet computers, etc. capable of capturing images (or video) of its environment. In some embodiments, the mobile device comprises a head mounted display (HMD), or a device configured to control an HMD.

The mobile device 100 may access the database 155 using the server 150 via a wireless network 120, e.g., based on a determined position of the mobile device 100. The mobile device 100 may retrieve the pre-recorded video content from the database 155 to be displayed on the display 102. The mobile device 100 may alternatively obtain the pre-recorded video content from other sources such as an internal storage device.

Figure 2:
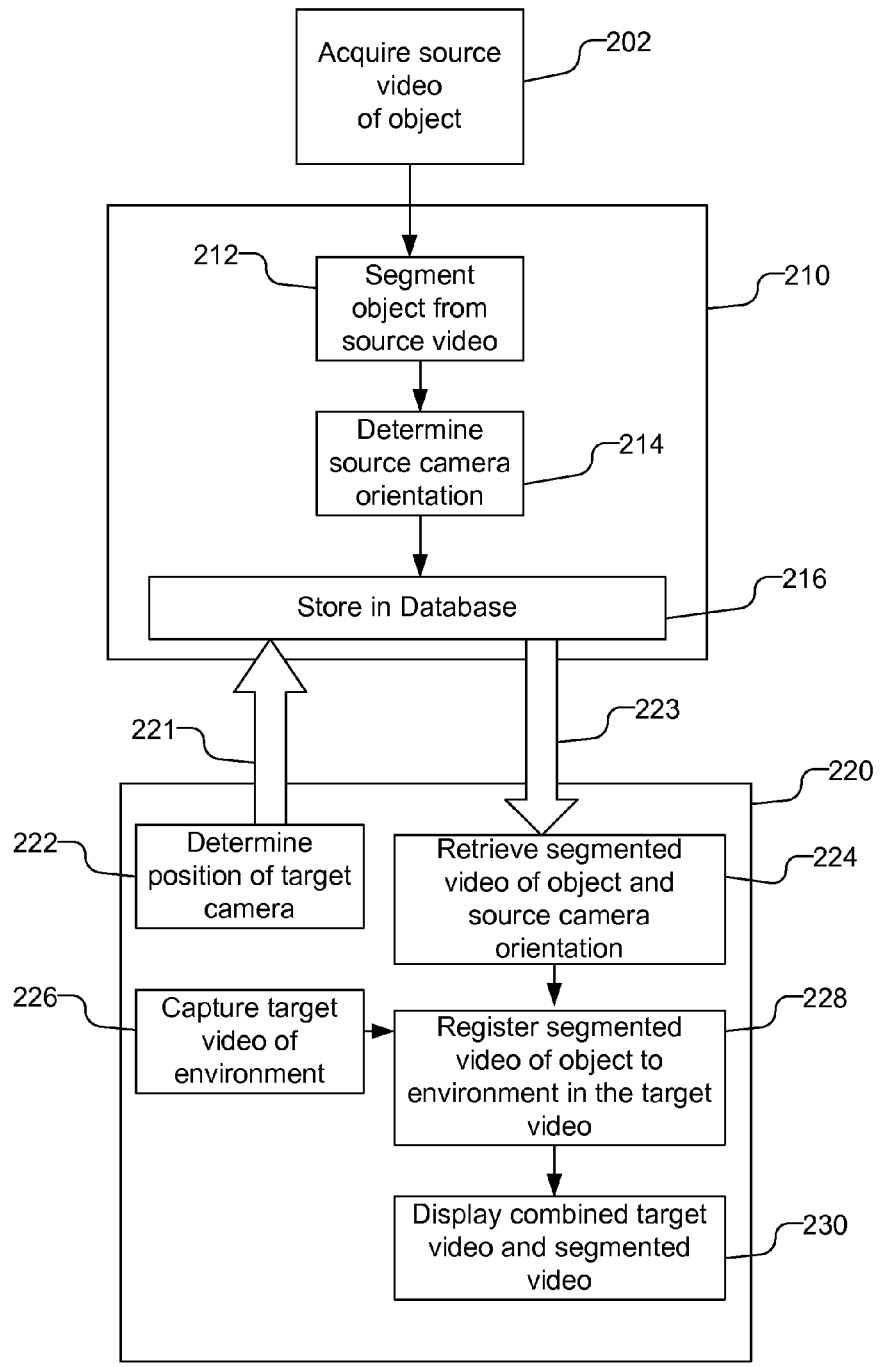
FIG. 2 illustrates a process that may be used to generate and replay the pre-recorded video content with spatial registration between the pre-recorded video content and a live video stream of the real world.

FIG. 2 illustrates a process that may be used to generate the pre-recorded video content (210) and to achieve accurate spatial registration between the pre-recorded video content and a live video stream of the real world (220). The process includes acquiring a plurality of source image frames that includes an object (202). The plurality of source image frames may be, e.g., in the form of a plurality of images or video captured by a camera, and for the sake of simplicity may be referred to as source video. In general, there may be two types of video sources for the source image frames. A first type of source is a video stream from the camera, from which each individual video frame may be accessed. Another source may be, e.g., a pre-recorded video, which may not have all video frames stored, but only keyframes with motion vectors for the remaining frames, such as found in MPEG or MP4 type formats. With pre-recorded video, all the video frames may be restored using, e.g., MPEG decoding, to produce the plurality of source images.

The object in the plurality of source images may be a person or any other desired object, e.g., foreground object. The source video will subsequently be processed to produce a segmented video of the object, i.e., the pre-recorded video content. The source video may be acquired by mobile device 100 shown in FIG. 1 or a different mobile device, which will sometimes be referred to herein as a source camera. The acquisition of the source video may include geo-tagging, i.e., identification of the position of the source camera during acquisition of the source video, or otherwise identifying a location at which the source video was captured, for example based on one or more of the position means described above. During acquisition of the source video, the source camera may be stationary or moved, e.g., rotated, translated or both.

The acquired source video of the object is processed (210), e.g., locally by the mobile device that acquired the source video, or by a processor, such as server 150, coupled to receive the source video from the source camera. As illustrated in FIG. 2, the object is segmented from the source video (212) and the source camera orientation for each frame of the source video is determined (214). The object may be segmented from the video, e.g., using a known process such as GraphCut. Segmentation processes, such as GraphCut, typically operate on a single image, as opposed to multiple frames in a video stream. Accordingly, the segmentation process may be combined with optical flow to segment the object in each frame of the plurality of source image frames, thereby producing a plurality of segmented image frames of the object. The plurality of segmented image frames may be, e.g., in the form of a plurality of images or video, and for the sake of simplicity may be referred to as segmented video. The resulting segmented video, thus, includes the object, without the background information, where the object may be, e.g., a foreground object or actor or a moving element from the source video captured by the source camera and designated by a user.

Additionally, the source camera orientation, or pose (orientation and position), is determined for a plurality of frames of the source video (214). By way of example, the source camera orientation may be an absolute orientation with respect to the environment, such as North aligned, as measured using sensors 112 (e.g., magnetometer). The source camera orientation may alternatively be a relative orientation with respect to the environment, such as being relative to the first frame (or other frame) in the source video, which may be determined using the background in the source video and vision based techniques and/or using sensors 112 (e.g., accelerometers, gyroscopes etc.) to measure the change in orientation with respect to the first frame for each frame of the source video. Thus, the source camera orientation may be monitored using sensors 112 during acquisition of the source video, e.g., to produce an absolute or relative orientation of the source camera, and the measured source camera orientation is associated with frames of the source video during processing. Alternatively, vision based techniques may be used to determine the source camera orientation relative to the background in one or more frames of the source video. For example, the background of the source video may be extracted and used to determine the orientation of the source camera. In one implementation, an image of the combined background from a number of frames, e.g., in the form of a panoramic image or image data, may be produced using the extracted background from the frames of the source video. During the production of the image of the combined background, the source camera orientation with respect to the background is tracked for each frame of the source video. The segmented video of the object may have a one-to-one frame correspondence to the source video (or other known correspondence due to compression) and, thus, the source camera orientation for each frame in the segmented video may be determined. It should be understood that even if certain frames are dropped, e.g., because the object cannot be segmented out of the frame, or if a source camera orientation cannot be determined for a particular frame, e.g., due to blur or other similar problems with the data, an estimate of the source camera orientation for those frame may be still be determined, e.g., based on the source camera orientation from a preceding frame, interpolation based on determined source camera orientations from surrounding frames, or the problem frame may be ignored. Thus, a strict one-to-one frame correspondence to the source video is not necessarily required. Moreover, if desired, the source camera orientation may be determined for less than all frames in the segmented video. For example, the source camera orientation may be determined for every few frames, where the source camera orientation for the in-between frames may be based on the previous orientation or from interpolation based on the source camera orientation from surrounding frames, or any other similar manners of inferring the source camera orientation. Additionally, the position of the source camera may be similarly determined, e.g., using sensors 112 or vision based techniques.

The segmented video of the object along with the source camera orientation for each frame in the segmented video is stored in a database (216). If geo-tagging of the source video was used, the position of the source camera during acquisition of the source video may also be stored in the database. Further, if desired, the extracted background, e.g., in the form of an image, such as a panoramic image, or image data, may be stored in the database. The image data for the extracted background may be, e.g., features or keypoints extracted from each frame and combined together to generate a sparse feature map. For example, features may be extracted using, e.g., Scale Invariant Feature Transform (SIFT), PhonySIFT, Speeded-up Robust Features (SURF), Features from Accelerated Segment Test (FAST) corner detector, or other appropriate techniques, which may be used for image mapping, thereby reducing the size of the data associated with the extracted background. If desired, a three-dimensional (3D) map (sparse 3D features database) may be generated for use with a Simultaneous localization and mapping (SLAM) tracker or other similar tracking techniques. Thus, the segmented video of the object, the source camera orientation or pose for frames in the segmented video, the extracted background, e.g., in the form of a panoramic image or image data such as a sparse feature map, and the position of the source camera may all be stored in the database, e.g., as a compressed dataset.

During the "replay" process (220), a mobile device 100 obtains the stored segmented video of the object and source camera orientation for each frame in the segmented video, and displays the segmented video of the object over a live video stream of a scene, with the object from the segmented video spatially registered to the view of the scene. The mobile device 100 provides the target video stream over which the segmented video is displayed and thus, the mobile device 100 may sometimes be referred to herein as the target camera. In some implementations, during replay, the target camera may be in the same geographical position as the source camera so that the object from the source video may be displayed by the target camera in the same geographical context, e.g., in the same environment, even though the object is no longer physically present at the geographical position. Thus, as illustrated in FIG. 2, in the "replay" process (220), the geographic position of the target camera may be determined (222), e.g., using an SPS system or other positioning techniques. In some embodiments, the mobile device 100 may be configured to optically recognize features or objects, for example that may be present in the background of the source video, and determine that it is located at a similar position as the source camera was located. The position of the target camera may be used to query the database (as illustrated by arrow 221) and in response, the segmented video of the object and the source camera orientation for each frame in the segmented video is retrieved (224) from the database (as illustrated by arrow 223), e.g., if the target camera is near the position of the source camera during acquisition of the source video. As discussed above, the processing (210) of the source video may be performed, e.g., by a processor, such as server 150, or by the mobile device that acquired the source video, which may be the same as or different from the mobile device that acquires the target video stream. Moreover, the database that stores the segmented video of the object and the source camera orientation for each frame in the segmented video may be an external database 155 or a storage device internal to the mobile device that acquired the source video, which may be the same as or different from the mobile device that acquires the target video stream. Accordingly, arrows 221 and 223 in FIG. 2 may illustrate data transmission across mediums, e.g., between database 155 and a mobile device 100 or between mobile devices (the mobile device that acquired the source video and the mobile device that acquired the target video). Alternatively, the arrows 221 and 223 may illustrate data retrieval within a single mobile device.

In some embodiments, the mobile device 100 may alert the user, e.g., with an alarm or visual display, if the target camera is determined to be near a position at which a source video was acquired. The user may then be given the option of viewing the associated segmented video and downloading the segmented video of the object and the source camera orientation for each frame in the segmented video. If desired, the segmented video of the object and the source camera orientation for each frame in the segmented video may be obtained from the database irrespective of the geographic position of the target camera.

The target camera captures a plurality of target image frames of the environment (226). The plurality of target image frames may be, e.g., in the form of a plurality of images or video captured by the target camera, and for the sake of simplicity may be referred to as target video. The segmented video of the object is registered to the environment in the target video (228). For example, the orientation of the target camera with respect to the environment may be determined while capturing the target video of the environment (228), e.g., using sensors 112, or the orientation may be determined using vision based techniques, such as those discussed above. A transformation for the segmented video may be calculated using the source camera orientation for each frame of the segmented video and the orientation of the target camera for each frame of target video of the environment. The target video is displayed with the spatially registered segmented video (230) using the transformation. Thus, the salient information from the pre-recorded video is provided so that a user may spatially navigate the pre-recorded video combined with a displayed live view of the real world. In this way, the segmented object may be displayed to the user so as to appear in the same position as when the source video was captured.

Figure 3:
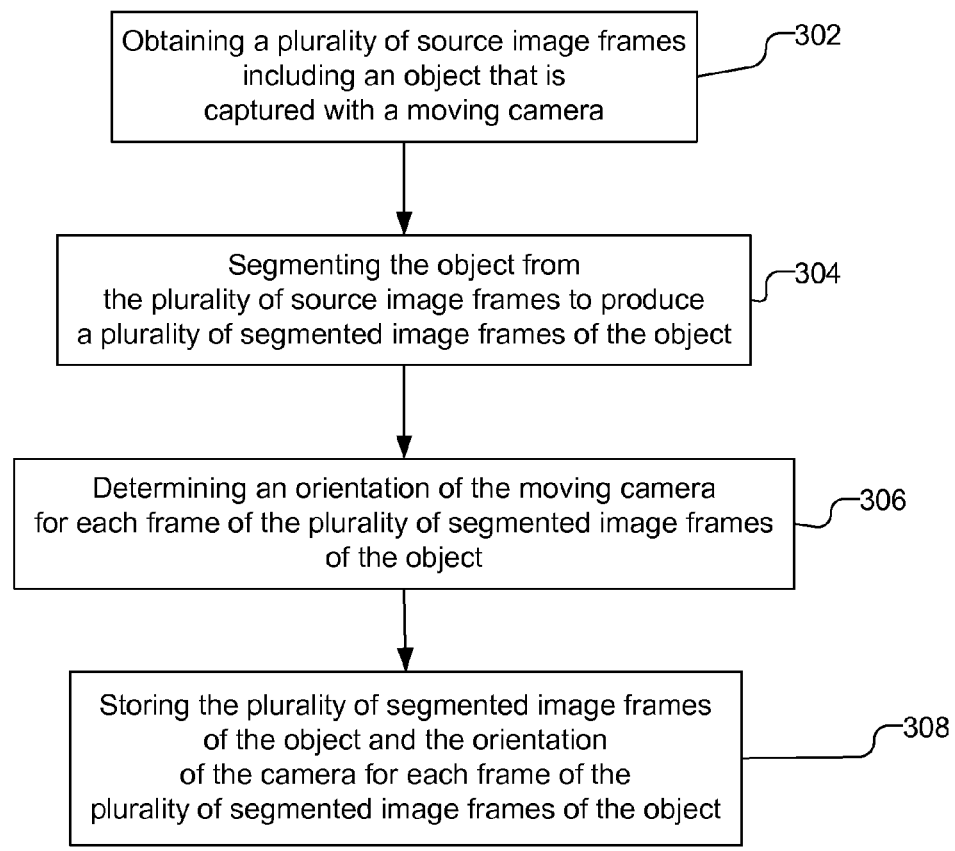
FIG. 3 is a flow chart illustrating processing of the source video of the object to produce a segmented video of the object.

FIG. 3 is a flow chart illustrating the processing of the source video of the object. As described above, the source video may be processed at the device capturing the video, for example in real-time or offline, or the source video may be processed at another device, for example the server 150. The video is processed to extract relevant information, i.e., the object, as well as to extract other information used to assist in overlaying the object on a subsequently captured target video stream. Thus, the object that is of interest is segmented from the remaining content in the source video, such as the background or foreground objects that are not of interest. Additional information such as the orientation of the source camera for each frame in the resulting segmented video of the object is also determined and stored to assist in registering the extracted object into a subsequently acquired target video of the same or different environment. Additionally, background information from the source video, e.g., in the form of a panoramic image, and the geographic position of the source camera during acquisition of the source video may also be determined and stored with the segmented video of the object. The processing of the source video may be performed using, e.g., the mobile device that captures the source video, a local processor coupled to mobile device to acquire the source video or a remote server to which the source video is uploaded.

As illustrated in FIG. 3, a plurality of source image frames is obtained that includes an object and that is captured with a moving camera (302). The moving camera may be rotating while otherwise stationary or, if desired, the camera may be translating, i.e., moving laterally, as well. The plurality of source image frames may be obtained, e.g., by capturing the plurality of source image frames using the camera 110 of a mobile device 100 (FIG. 1), or may be obtained when a source camera uploads the plurality of source image frames, e.g., to a desktop computer or remote server. The object is segmented from the plurality of source image frames to produce a plurality of segmented image frames of the object (304). The object, by way of example, is a foreground object or actor or a moving element from the plurality of source frames captured by the source camera and designated by a user.

Figure 4A:
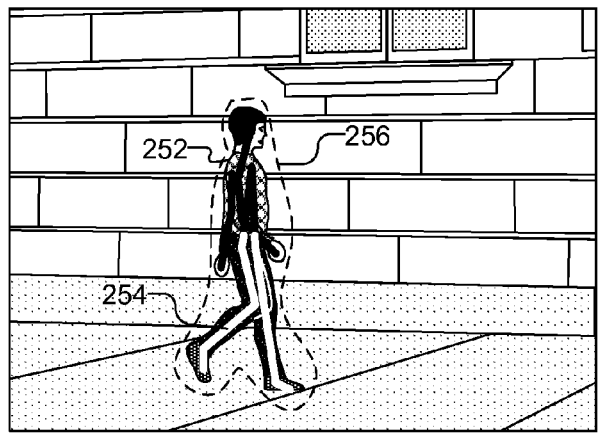
FIG. 4A illustrates a single frame of a source video stream that shows person walking in front of a building.
Figure 4B:
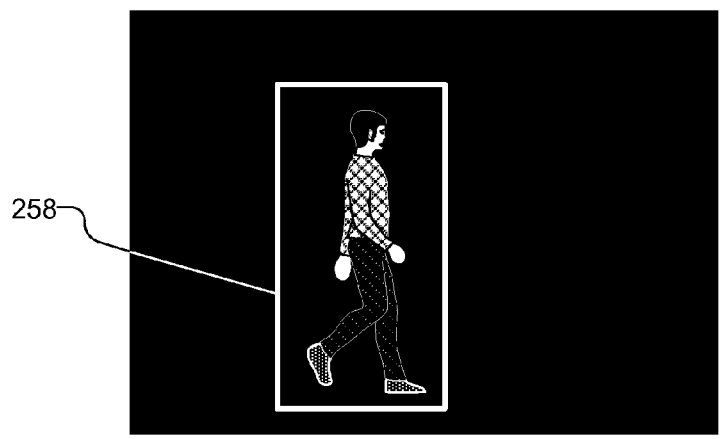
FIG. 4B illustrates a single frame of a source video stream from FIG. 4A with the person segmented from the remaining video frame.
Figure 4C:
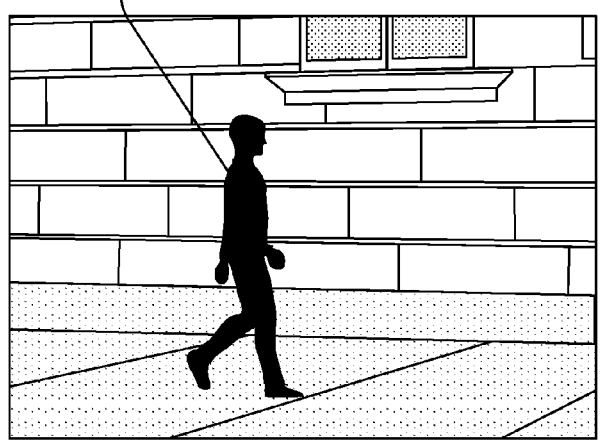
FIG. 4C illustrates the single frame of the source video stream from FIG. 4A with the background segmented.

Segmentation of the object from the video stream may be performed by applying an image segmentation process. For example, one suitable segmentation process is a variation of the well-known GraphCut algorithm, namely GrabCut, which is used for segmentation of objects in still images, but of course other segmentation processes may be used. To initiate the segmentation process, a user may select the object of interest, e.g., by roughly identifying the object or an area around or near the object of interest, and mark some of the surrounding background pixels in an initial frame of the plurality of source image frames. For example, FIG. 4A illustrates a single frame of a plurality of source image frames that shows an object 252, as a person walking in front of a building. The user may identify the object 252, as indicated by lines 254, and mark the surrounding background pixels by outlining the object 252, as indicated by dotted lines 256. The segmentation process, such as GrabCut, will segment the identified object from the remaining video frame, thereby producing a frame with the segmented object, as illustrated in FIG. 4B, as well as a frame of the segmented background, as illustrated in FIG. 4C. With the occluding foreground object segmented out of the background, holes 260 will be present the background pixels, as illustrated in FIG. 4C.

The GrabCut algorithm, and other similar segmentation processes, operates on a single static image. Consequently, the segmentation process will segment the object and background for a single frame of video at a time. The object, however, is to be segmented from each frame in the plurality of source image frames. To avoid the cumbersome task of manually marking every individual frame of the source video, the result of the segmentation process for each frame may be used to initialize the segmentation computation for the next frame in the source video.

As there is likely movement of the object between two consecutive frames, the result of the segmentation process from one frame cannot be used directly to initialize the segmentation computation for the next frame. The movement of the object between consecutive frames may be addressed by estimating the position of the object in a current frame by computing the optical flow of pixels from the previous frame, e.g., using the Lucas-Kanade method. The optical flow estimation provides an approximation of the position of the object in the current frame, which may be used to initialize the segmentation computation for the current frame in the source video. Thus, the object is identified in each subsequent frame of the plurality of source image frames based on optical flow using the identification of the object from a proceeding frame of the plurality of source image frames. However, as the position of the object in the current frame is an estimation, the estimated footprint of the object in the current frame, e.g., the background pixels surrounding the object such as illustrated by line 256 in FIG. 4A, may be dilated to compensate for tracking inaccuracies.

Thus, using optical flow of pixels from the object segmented in a previous frame, the boundary of the object in the current frame may be estimated and accordingly pixels of the object and background pixels surrounding the object in the current frame may be automatically selected and used as to initialize the segmentation process for the current frame of the source video. This approach may be applied for each successive frame to yield the segmentation of the object (and the background) for all consecutive frames of the plurality of source image frames to produce the plurality of segmented image frames of the object. Additional processing and filtering may be applied, e.g., dilate and erosion functions may be applied on the segmented object to remove noisy border pixels. Moreover, only the largest connected components segmented from each frame may be retained as the object in cases where the segmentation computed more than one component, in some embodiments. If desired, a manual initialization of the segmentation process may be applied in any desired frame, e.g., in case the object of interest is not segmented properly using the automatic process.

As can be seen by comparing the segmented object in FIG. 4B with the full unsegmented video frame shown in FIG. 4A, the resulting segmented object in any one frame is often only a fraction of the size of the full video frame. Accordingly, to reduce the data size, the segmented object for each frame may be saved as only a bounding rectangle 258 around the object along with the bounding rectangle's offset within the video frame.

Referring back to FIG. 3, the orientation of the moving camera for each frame of the plurality of segmented image frames of the object is determined (306). As discussed above, the orientation of the moving camera may be an absolute orientation with respect to the environment, such as North aligned, as measured using sensors 112, or a relative orientation with respect to the environment, such as being relative to the first frame (or other frame) in the source video, which may be determined using the background in the source video and vision based techniques and/or using sensors 112 (e.g., accelerometers, gyroscopes etc.). The orientation of the moving camera, for example, may be determined using vision based techniques or if desired, using inertial sensors, such as accelerometers, gyroscopes, magnetometers, and the like, or a combination of vision based techniques and inertial sensors. By way of example, the orientation of the moving camera may be determined using visual tracking techniques with respect to the segmented background of the plurality of source image frames. The plurality of segmented image frames of the object may have a one-to-one frame correspondence with the segmented background of the plurality of source image frames (or other known correspondence due to compression) and, thus, the determined the camera orientation with respect to the segmented background in frames of the plurality of source image frames may provide the camera orientation for the frames in the segmented video. If desired, the orientation of the source camera may be determined for every captured source image frame or for less than all of the captured source image frames, as discussed above. The lateral translation of the camera may similarly be determined using sensors or visual tracking techniques, thereby providing the pose (orientation and position) for the frames in the segmented video.

The plurality of segmented image frames of the object and the orientation of the moving camera for each frame of the plurality of segmented image frames of the object are stored (308).

Additionally, the background associated with the plurality of segmented image frames of the foreground object, i.e., the background from the plurality of source image frames, may be stored. For example, the background may be stored as a panoramic image that is generated using the segmented background from the plurality of source image frames. Alternatively, the background may be stored as a sparse feature map, such as a sparse 3D features database for use with a SLAM tracker or other similar tracking techniques.

Additionally, if desired, multiple cameras may be used to capture the source video. The video stream from each of the multiple cameras may be processed as discussed above and the result merged to create an augmentation that is less two-dimensional or less sensitive to parallax. If desired, the resulting segmented video from each camera may be retained separately, where a suitable view may be later selected for display based on a position or other transform of the target camera. Additionally, the background information may be more easily and completely filled using the captured video from multiple cameras.

Due to the possibility that the camera may be rotated while recording the source video stream, the frames of the source video stream may hold different portions of the scene's background. Additionally, as illustrated in FIG. 4C, the foreground object occludes parts of the background in each frame of the source video stream, reducing the amount of visual features that are later available for vision-based registration. Thus, it may be desirable to store as much background information as possible, i.e., from all of the frames from the source video stream, as opposed to only a single video frame. One manner of storing background information from a video stream is to integrate the background pixels from all frames in the source video into a panoramic image.

Generating a panoramic image with a stream of images from a rotating camera is a known image processing technique. Generally, a panoramic image may be generated by tracking a video stream frame-by-frame and mapping each frame onto a panoramic cylindrical map. During the frame-by-frame tracking of the video stream, features are extracted from each new frame and matched with extracted features in the panoramic cylindrical map using Scale Invariant Feature Transform (SIFT), PhonySIFT, Speeded-up Robust Features (SURF), Features from Accelerated Segment Test (FAST) corner detector, or other appropriate techniques, such as using sensors 112 (accelerometers, gyroscopes, magnetometers, etc.) to create a panoramic image. Matching a new frame to the panoramic cylindrical map determines the orientation of the new frame with respect to the panoramic cylindrical map and, thus, the background of the scene. Empty portions of the panoramic cylindrical map are filled with pixels from each new frame after the new frame is mapped onto the panoramic cylindrical map. When completed, the panoramic cylindrical map may be used as the panoramic image, which may be, e.g., 2048×512 pixels.

Figure 5:
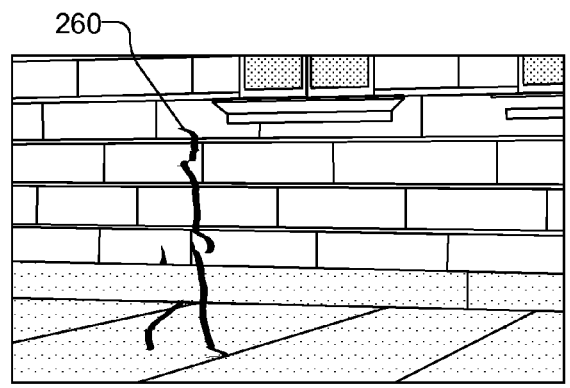
FIG. 5 illustrates a portion of a panoramic image with the holes caused by the occluding foreground object partly filled.

By using the segmented background for each frame, e.g., as illustrated in FIG. 4C, only the background pixels are mapped into the panoramic image. The alpha channel may be used to mask out undesirable parts while generating the panoramic image. As can be seen in FIG. 4C, however, holes in the background pixels are present in each frame due to the segmented occluding foreground object. The resulting holes that are mapped onto the panoramic cylindrical map, however, may be closed by filling the empty portion of the panoramic cylindrical map with background pixels from subsequent frames that are not occluded by the foreground object. FIG. 5, for example, illustrates a portion of a panoramic image being generated with the holes 260 caused by the occluding foreground object, shown in FIG. 4C, partly filled. Of course, it should be understood that the subsequent segmented background frames will also include holes caused by the occluding foreground object, which will be mapped onto the panoramic cylindrical map and will similarly be filled with background pixels in subsequent background frames, but are not shown in FIG. 5 for the sake of simplicity.

Figure 6:
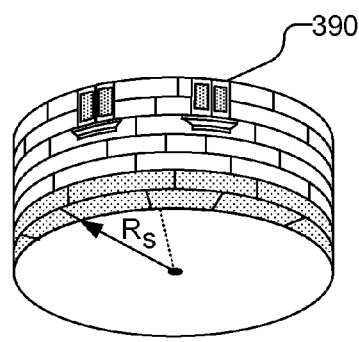
FIG. 6 illustrates a source panoramic image produced using the source video and shows the orientation $R_s$ of the source camera with respect to the background for a single frame of the segmented video.

As discussed above, while generating the panoramic image, the orientation $R_s$ of the source camera with respect to the background of the scene is tracked for each frame by matching extracted features from each frame to extracted features in the panoramic cylindrical map. FIG. 6, by way of example, illustrates a source panoramic image 390 as a cylindrical map produced using the source video and shows the orientation $R_s$ of the source camera with respect to the background for a single frame of the segmented video. The orientation $R_s$ may be used as the orientation of the source camera for each frame of the segmented video stream of the object.

Thus, as discussed above, the orientation $R_s$ of the rotating camera for each frame of the segmented video stream is stored along with the segmented video stream of the object. Additionally, if desired, the background, e.g., in the form of a panoramic image may also be stored with the segmented video stream. Further, if desired, the geographic position of the source camera during acquisition of the source video, e.g., the geo-position as determined using a SPS system or similar positioning techniques, may be associated with the segmented video stream.

Figure 7:
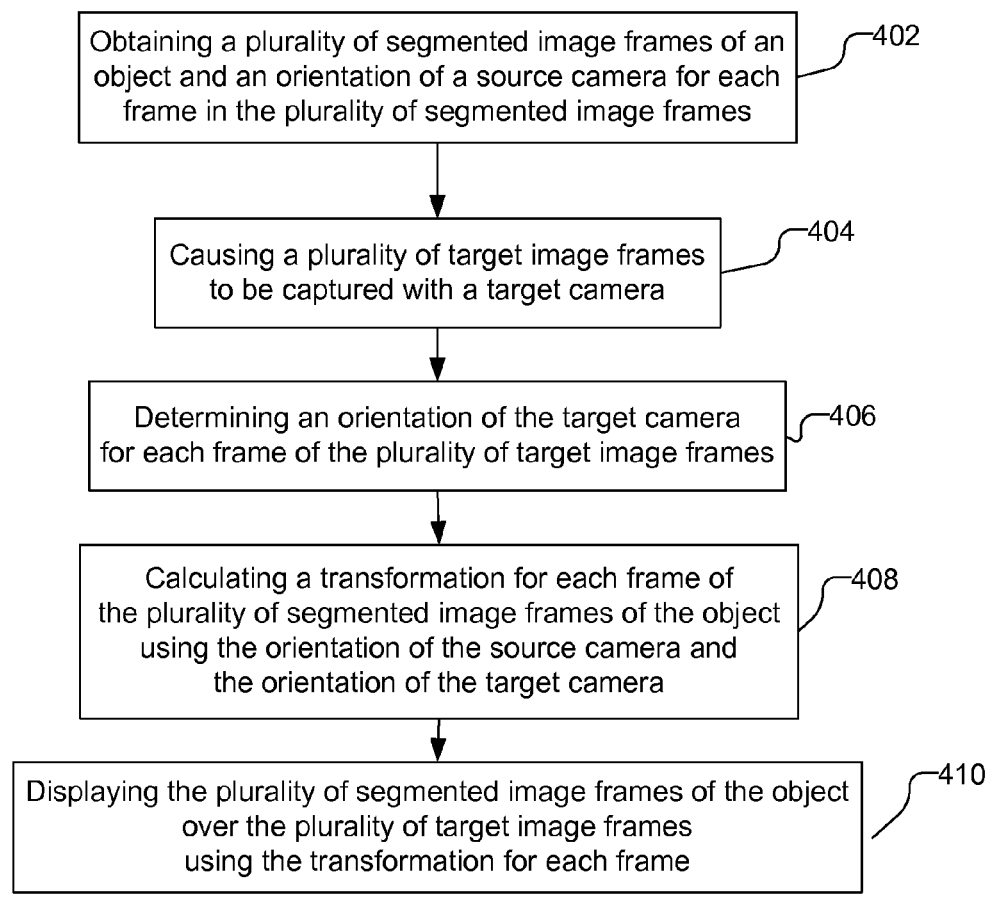
FIG. 7 is a flow chart illustrating the process to "replay" the segmented video stream of the object spatially registered over a target video stream, which may be a live video stream.

FIG. 7 is a flow chart illustrating the process to "replay" the segmented video stream of the object spatially registered over a target video stream, which may be a live video stream. The segmented video stream may be replayed on the mobile device 100 (FIG. 1) for example. The mobile device 100 may include a user interface, e.g., on the touch screen display 102, that allows a user to control the play back of the segmented video stream. For example, the user interface may include playback controls such as play control buttons, time slider and speed buttons. If desired, the target video may also be controlled, e.g., to control the speed of playback so that the target video stream is not a live video stream. Additionally, the user may be presented with an interface to select one or more desired segmented video streams that may be played if more than one is available. Additionally controls, such as video effects may be made available as well.

As illustrated in FIG. 7, a plurality of segmented image frames of an object is obtained along with an orientation of the source camera for each frame in the plurality of segmented image frames (402). As discussed above, the plurality of segmented image frames of the object is generated using a plurality of source image frames that was captured by a source camera and processed to produce the plurality of segmented image frames of the object and the orientation of the source camera. As discussed above, the plurality of segmented image frames may be produced using source videos from multiple cameras that are segmented and combined together. Nevertheless, it should be clear that the plurality of segmented image frames of the object is a two-dimensional representation of the object captured by the source camera, as opposed to a computer rendered object. The plurality of segmented image frames of the object may be obtained, e.g., from internal storage or remote storage, e.g., database 155 in FIG. 1. Moreover, the plurality of segmented image frames of the object and orientation of the source camera for each frame may be obtained based on geographic position. For example, a target camera, e.g., mobile device 100, may determine its current position, e.g., using the SPS system or other positioning techniques and may query a database of stored video augmentations based on the current position. Video augmentations, e.g., the plurality of segmented image frames of the object and the orientation of the source for each frame in the plurality of segmented image frames, that are associated with the position may be retrieved from the database. If desired, however, the plurality of segmented image frames of the object and the orientation of the source camera may be obtained irrespective of position.

A plurality of target image frames are captured with the target camera (404). As discussed above, with respect to the source camera, the target camera may rotate while capturing the target video stream. If desired, the target camera may also translate, e.g., move laterally.

Figure 8:
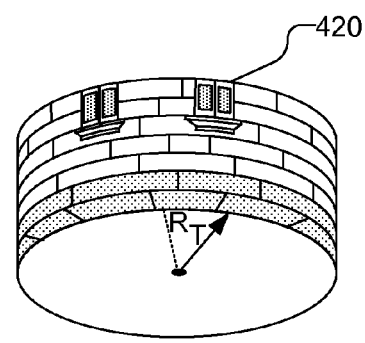
FIG. 8 illustrates a target panoramic image produced using the target video stream and shows the orientation $R_T$ of the target camera with respect to the background for a single frame of the target video stream.

The orientation of the target camera for each frame of the plurality of target image frames is determined (406). By way of example, the orientation of the target camera may be determined using inertial sensors, e.g., accelerometers, gyroscopes, magnetometers, etc., or vision based tracking techniques, or a combination of vision based techniques and inertial sensors. The use of vision based tracking techniques to determine the orientation of the target camera is advantageous as it provides higher precision registration and tracking, as it does not rely on sensor values which may be noisy. The vision based tracking techniques, e.g., may be the same as discussed above, e.g., SLAM tracking or while generating a panoramic image, the orientation $R_T$ of the target camera with respect to the background of the scene is tracked for each frame by matching extracted features from each frame of the plurality of target image frames to extracted features in the panoramic image. FIG. 8, by way of example, illustrates a target panoramic image 420 as a cylindrical map produced using the plurality of target image frames and shows the orientation $R_T$ of the target camera with respect to the background for a single frame of the plurality of target image frames. As can be seen, the target panoramic image 420 produced by the target camera, shown in FIG. 8, is similar to the source panoramic image 390 produced by the source camera, shown in FIG. 6, as the target camera may acquire the plurality of target image frames while at the same geographic position as the source camera when the source video was acquired. It should be understood, however, that the target camera need not necessarily be at the same geographic position as the source camera, and thus, the source panoramic image and target panoramic image may differ. Nevertheless, if the panoramic image produced by the target camera is different than the panoramic image produced by the source camera, the orientation of the target camera $R_T$ with respect to the background is still determined.

Figure 9:
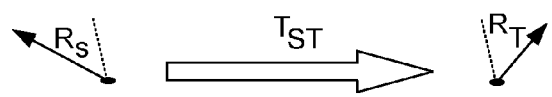
FIG. 9 illustrates a transformation $T_{ST}$ calculated for a single frame of video that describes the relative orientation difference between the orientation $R_S$ of the source camera and the orientation $R_T$ of the target camera.

A transformation for each frame of the plurality of segmented image frames of the object is calculated using the orientation of the source camera and the orientation of the target camera (408). As illustrated for a single frame in FIG. 9, the transformation $T_{ST}$ describes the relative orientation difference between the orientation $R_S$ of the source camera and the orientation $R_T$ of the target camera for each frame of the plurality of segmented image frames of the object with respect to the plurality of target image frames. Thus, using the transformation $T_{ST}$, the plurality of segmented image frames of the object may be displayed over the plurality of target image frames (410), e.g., where the transformation $T_{ST}$ is used to spatially register the plurality of segmented image frames of the object to the background in the plurality of target image frames.

The transformation $T_{ST}$ may be obtained using a background associated with the plurality of segmented image frames of the object, e.g., when the plurality of target image frames is captured from the same geographical location as the source video stream and therefore includes the same background. For example, the background associated with the plurality of segmented image frames of the object may be obtained. The background associated with the plurality of segmented image frames of the object may be matched with the background included in the plurality of target image frames to align the backgrounds. The transformation $T_{ST}$ may then be calculated using the aligned backgrounds so that when the plurality of segmented image frames of the object is displayed over the plurality of target image frames, the object's position with respect to the background will be the same as in the source video. For example, the background associated with the plurality of segmented image frames of the object may be a first panoramic image produced by the source camera. A second panoramic image is generated from the background included in the plurality of target image frames. Thus, matching the background associated with the plurality of segmented image frames of the object with the background included in the plurality of target image frames may be performed by matching the first panoramic image to the second panoramic image.

By way of example, when panoramic images are used, the target panoramic image 420 (FIG. 6) produced by the target camera may be matched to the source panoramic image 390 produced by the source camera. The target and source panoramic images may be matched, e.g., while building the target panoramic image by extracting and matching features from the target and source panoramic images. When the matching portion of the target and source panoramic images is sufficiently large, i.e., greater than a set threshold, the matching of the two panoramic images may be considered a success. With the target panoramic image 420 and the source panoramic image 390 successfully aligned, and transformation $T_{ST}$ between the orientation $R_S$ of the source camera and the orientation $R_T$ of the target camera may be determined.

If the plurality of target image frames is not captured at the same geographic position as the source video, the target and source panoramic images will not match. Nevertheless, the target and source panoramic images may be aligned by defining and aligning an origin in both panoramic images.

The combination of the orientation $R_S$ of the source camera, the transformation $T_{ST}$, and the orientation $R_T$ of the target camera is applied to each frame of the plurality of segmented image frames of the object, so that the plurality of segmented image frames of the object may be displayed over the plurality of target image frames with close registration of the object to the background in the plurality of target image frames. Because the orientation $R_T$ of the target camera may be updated for each frame, the target camera may be rotated completely independently from the orientation of the source camera, while maintaining the registration of the plurality of segmented image frames of the object in the current view.

Figure 10A:
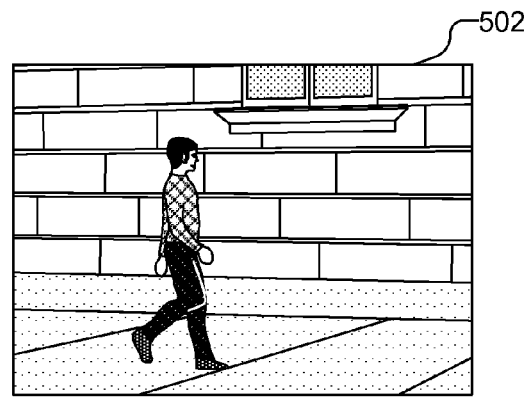
FIGS. 10A, 10B, and 10C illustrate single frames of a source video, target video and the target video combined with a segmented video of the object.
Figure 10B:
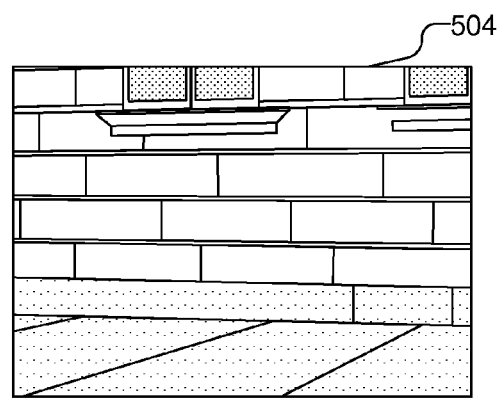
Figure 10C:
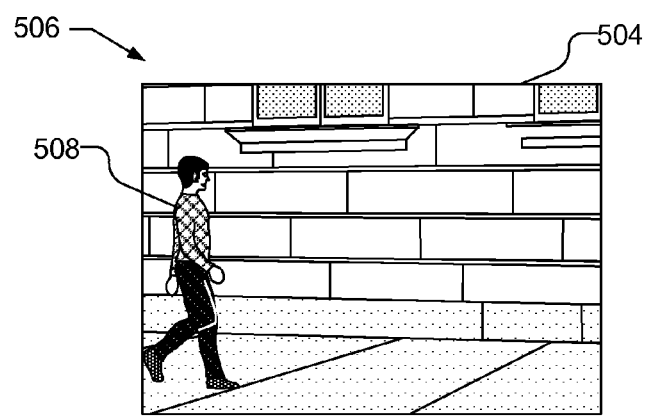

FIGS. 10A, 10B, and 10C illustrate a single frame of a source video 502, a single frame of a target video 504 and a single frame 506 of the target video 504 combined with a plurality of segmented image frames of the object 508. As can be seen by comparing the single frames of the source video 502 in FIG. 10A and the target video 504 of FIG. 10B, the orientation $R_S$ of the source camera and the orientation $R_T$ of the target camera are slightly different. Thus, the transformation $T_{ST}$ between the orientation $R_S$ of the source camera and the orientation $R_T$ of the target camera is applied to the plurality of segmented image frames of the object to spatially register the plurality of segmented image frames of the object to the target video. Thus, as illustrated by the frame 506 in FIG. 10C, when combined, the plurality of segmented image frames of the object is spatially registered to target video.

Additionally, if desired, the transformation for each frame of the plurality of segmented image frames of the object may be at least partially based on a difference between the position of the source camera when the source video was captured and the position of the target camera when the plurality of target image frames is captured. The difference in position of the source camera and the target camera may be obtained, e.g., by comparing geographical positions, e.g., obtained using SPS or other techniques. The difference in position of the source camera and the target camera may alternatively or additionally be determined using vision based tracking techniques, e.g., where a position of the target camera with respect to the target panoramic image is determined and compared to a similarly determined position of the source camera with respect to the source panoramic image.

The difference in position of the source camera and target camera may be used to alter the plurality of segmented image frames of the object so that object in the plurality of segmented image frames of the object appears natural when displayed over the target video. For example, while the target camera may be near to the position from which the source video was acquired, changes in the position may cause the plurality of segmented image frames of the object to appear unnatural, e.g., inappropriate size or perspective of the object, when displayed over the target video. Accordingly, it may be desirable to alter the plurality of segmented image frames of the object based on the difference in positions of the source camera and target camera in order to make the overlay appear natural. For example, if source camera was farther from the location of the object when the source video was recorded than the position of the target camera to that location of the object, the object will appear too small when the plurality of segmented image frames of the object is displayed over the target video. Accordingly, the size of the plurality of segmented image frames of the object may be increased in size by an amount corresponding to the difference in position of the target camera and source camera. Similarly, it may be desirable to decrease the size of the plurality of segmented image frames of the object if the source camera was closer to the location of the object than the position of the target camera to that location of the object. The size of the plurality of segmented image frames of the object may also be adjusted based on the relative size of features in the target video. Further, lateral displacement of the position of the target camera with respect to the position of the source camera may make an alteration of the perspective, e.g., foreshortening, of the object in the plurality of segmented image frames desirable. The transformation thus may be calculated to compensate for the difference in position of the source camera and the target camera. For example, the respective positions of the source camera and the target camera may be determined, e.g., using the respective source panoramic image and target panoramic image, and the difference used to generate a transformation for each frame of the plurality of segmented image frames. Alternatively, the transformation for each frame of the plurality of segmented image frames may be determined based on the warping that is necessary to match the target panoramic image to the source panoramic image, or vice versa.

Additionally, if desired, a background associated with the plurality of segmented image frames of the object may be compared to the background in the video stream of images to determine a lighting difference, e.g., differences in contrast and color. The plurality of segmented image frames of the object may be adjusted, e.g., in contrast and color, based on the lighting difference, before displaying the plurality of segmented image frames of the object over the plurality of target image frames thereby implementing an adaptive visual coherence.

As discussed above, visual effects may be made available to the user. Effects may be used to highlight actions, and create views that are impossible in the real world, such as slow motion or highlighting of elements within the video. For example, effects such as multiexposure, open flash and flash-trail effects may be employed. Such video effects and video layers may not require any preprocessing but are carried out on the mobile device while playing back the augmented video(s) in some embodiments.

Multiexposure effects, for example, simulate the behavior of a multi exposure film where several images are visible at the same time. Multiexposure effects may be simulated by augmenting several frames of the plurality of segmented image frames of the object at the same time. The result is the object appears several times within the current view, such as in a multiple exposure image.

An extension of the multiexposure effect is the flash trail effect, which produces multiple instances of the same subject but the visibility depends on the amount of time that has passed. This effect supports a better understanding of the motion in the recorded video. The flash trail effect may be produced by blending in past frames of the augmented video with increasing amount of transparency. The strength of the transparency and the time between the frames can be freely adjusted.

Additionally, more than one augmented video may be played back at once, which allows a comparison of actions that were performed at the same place but at a different times by integrating them into one view, thus bridging time constraints. Each augmented video, for example, may correspond to a video layer, which the user can switch between or play simultaneously.

Other visual effects that can be enabled are different glow or drop-shadow variations that can be used to highlight the video object or in the case several video layers are playing at the same time the glow effect can be used to highlight a certain video layer.

In some embodiments, a plurality of segmented image frames may be displayed to a user without display of the target video. For example, such embodiments may be used when the mobile device comprises an HMD or is used to instruct an HMD. Some HMDs are configured with transparent or semi-transparent displays. Thus, while the frame 504 is being captured, for example, the user may see a similar view of a scene through the display without the mobile device causing the frame 504 to be displayed. In such implementations, the plurality of segmented image frames may be displayed so as to appear spatially registered with the user's view. The user may thus see a scene similar to that displayed in FIG. 10C without the frame 504 being displayed.

By way of illustration, a plurality of segmented image frames of a docent describing art, architecture, etc. in a museum may be generated. A user wearing an HMD may view the art or architecture through the HMD, while also seeing in the HMD the plurality of segmented image frames of the docent spatially registered to the user's view of the art or architecture. Accordingly, the user may view the actual art or architecture in the museum (as opposed to a video of the art or architecture) while also viewing the spatially registered plurality of segmented image frames of the docent describing the art or architecture that the user is viewing. Other illustrations may include, but are not limited to, e.g., sporting or historical events, where the user may view the actual location while viewing spatially registered plurality of segmented image frames of the sporting or historical event. Similarly, a user of a mobile device such as the mobile device 100 may use the device to view the docent or sporting or historical events with a display of the device.

Figure 11:
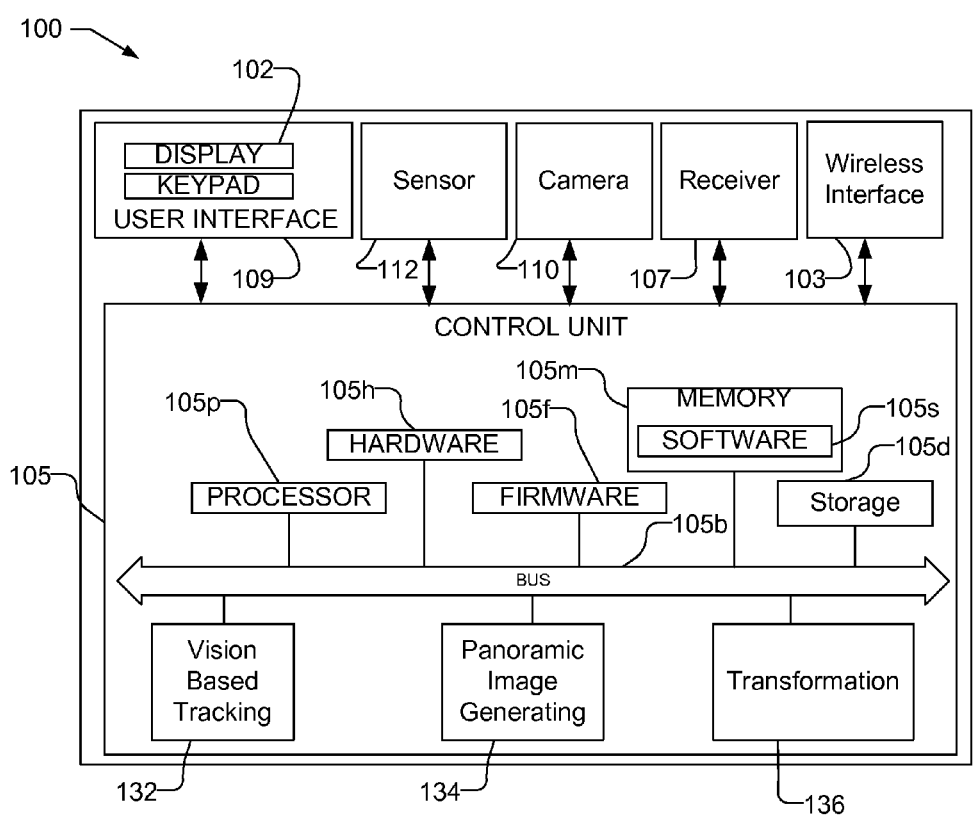
FIG. 11 is a block diagram of a mobile device capable of displaying a pre-generated segmented video stream of an object over a target video stream.

FIG. 11 is a block diagram of a mobile device 100 capable of displaying a pre-generated segmented video stream of an object over a target video stream, which may be a live video stream, as discussed above, e.g., with respect to FIG. 7. The mobile device 100 may include a wireless interface 103 to access a database 155 through the server 150 via the wireless network 120 as illustrated in FIG. 1, e.g., to obtain the segmented video stream of the object and the orientation of the source camera for each frame of the segmented video stream. Alternatively, the mobile device 100 may locally store and obtain the segmented video stream of the object and the orientation of the source camera for each frame of the segmented video stream from storage 105d. The mobile device 100 further includes a camera 110 which functions as the target camera. The mobile device 100 may further include a receiver 107, e.g., for receiving geographic position data and may include sensors 112, such as accelerometers, gyroscopes, magnetometers, etc. The mobile device 100 may further include a user interface 109 that may include e.g., the display 102, as well as a keypad or other input device through which the user can input information into the mobile device 100.

The wireless interface 103 may be used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATS) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used. The wireless interface 103 maybe omitted in some embodiments.

The mobile device 100 also includes a control unit 105 that is connected to and communicates with the camera 110, wireless interface 103, as well as receiver 107 and sensors 112 if present. The control unit 105 accepts and processes the target video stream captured by the camera 110 and the segmented video of the object to spatially register the segmented video of the object spatially registered to the target video stream on the display 102 as discussed above. The control unit 105 may be provided by a bus 105b, processor 105p and associated memory 105m, hardware 105h, firmware 105f, and software 105s. The control unit 105 may further include storage 105d, which may be used to store the segmented video of the object and the orientation of the camera locally on the mobile device 100. The control unit 105 is further illustrated as including a vision based tracking module 132 that may be used to determine the orientation of the target camera with respect to the background in the target video stream. A panoramic image generating module 134 may be used to produce a panoramic image of the background in the target video. A transformation module 136 calculates a transformation for each frame of the segmented video of the object using the source camera orientation and the target camera orientation.

The various modules 132, 134, and 136 are illustrated separately from processor 105p for clarity, but may be part of the processor 105p or implemented in the processor based on instructions in the software 105s which is run in the processor 105p, or may be implemented in hardware 105h or firmware 105f. It will be understood as used herein that the processor 105p can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 105h, firmware 113f, software 105s, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 105m and executed by the processor 105p. Memory 105m may be implemented within or external to the processor 105p. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the mobile device 100 may include means for obtaining a plurality of segmented image frames of an object and an orientation of a source camera for each frame in the plurality of segmented image frames, the plurality of segmented image frames of the object captured with the source camera, for example, as described with respect to 402, which may be, e.g., the wireless interface 103 or storage 105d. Means for capturing a plurality of target image frames with a target camera, for example, as described with respect to 404, may include the camera 110. Means for determining an orientation of the target camera for each frame of the plurality of target image frames, for example, as described with respect to 406, may be, e.g., a vision based tracking module 132, or may include the sensors 112 that provide inertial sensor data related to the orientation of the target camera 110 while capturing the target video stream. A means for calculating a transformation for each frame of the plurality of segmented image frames of the object using the orientation of the source camera and the orientation of the target camera, for example, as described with respect to 408, may be the transformation module 136. Means for displaying the plurality of segmented image frames of the object over the plurality of target image frames using the transformation for each frame, for example, as described with respect to 410, may include the display 102. The mobile device may further includes means for obtaining a background associated with the plurality of segmented image frames of the object, which may be, e.g., the wireless interface 103 or storage 105d. A means for matching the background associated with the plurality of segmented image frames of the object with the background included in the plurality of target image frames may be, e.g., the transformation module 136. A means for generating a second panoramic image from the background included in the plurality of target image frames may be, e.g., the panoramic image generating module 134, where matching the background associated with the segmented video of the object with the background included in the target video stream matches a first panoramic image of the background associated with the segmented video of the object to the second panoramic image.

Figure 12:
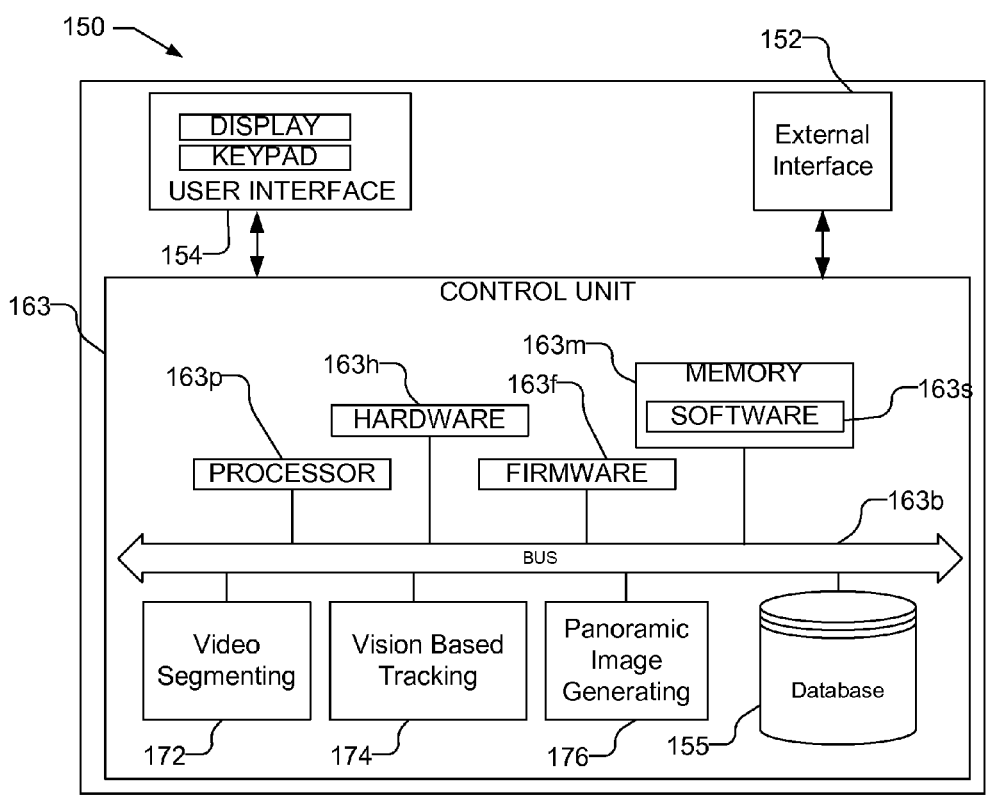
FIG. 12 is a block diagram of a server capable of processing a source video stream to extract a desired object from the remainder of video stream to produce a segmented video of the object.

FIG. 12 is a block diagram of a server 150 capable of processing a source video stream to extract a desired object from the remainder of video stream to produce a segmented video of the object, as discussed above, e.g., with respect to FIG. 3. It should be understood, however, that processing the source video stream to produce a segmented video of the object may be performed by devices other than server 150, including the mobile device 100. Server 150 is illustrated as including an external interface 152 that may be used to communicate with a mobile device having a source camera to receive a source video stream, as well as any other desired related data, such as the geographic position of the source camera and inertial sensor data related to the orientation of the source camera while capturing the source video. The server 150 may further include a user interface 154 that may include e.g., a display, as well as a keypad or other input device through which the user can input information into the server 150.

The external interface 152 may be a wired interface to a router (not shown) or a wireless interface used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The server 150 also includes a control unit 163 that is connected to and communicates with the external interface 152. The control unit 163 accepts and processes the source video received from, e.g., the external interface 152. The control unit 163 may be provided by a bus 163b, processor 163p and associated memory 163m, hardware 163h, firmware 163f, and software 163s. The control unit 163 is further illustrated as including a video segmenting module 172, which extracts the object of interest from the source video to produce a segmented video of the object as discussed above. A vision based tracking module 174 may be used to determine the orientation of the source camera with respect to the background in the source video, while a panoramic image generating module 176 produces a panoramic image of the background in the source video. The database 155 is illustrated coupled to the bus 163b and is used to store the segmented video of the object, and orientation of the source camera for each frame of the segmented video of the object, as well as any other desired information, such as the geographic position of the source camera, e.g., as received from the external interface 152 (or obtained from SPS receiver 156), and the background from the source video, e.g., as a panoramic image.

The different modules 172, 174, and 176 are illustrated separately from processor 163p for clarity, but may be part of the processor 163p or implemented in the processor based on instructions in the software 163s which is run in the processor 163p or may be implemented in hardware 163h or firmware 163f. It will be understood as used herein that the processor 163p can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 163h, firmware 113f, software 163s, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 163*m* and executed by the processor 163*p*. Memory 163*m* may be implemented within or external to the processor 163*p*. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, an apparatus, such as the server 150, may include means for obtaining a plurality of source image frames including an object that is captured with a moving camera, for example, as described with respect to 302, which may be, e.g., external interface 152 or a camera 110 if the apparatus is the mobile device 100. A means for segmenting the object from the plurality of source image frames to produce a plurality of segmented image frames of the object, for example, as described with respect to 304, may be, e.g., video segmenting module 172. A means for determining an orientation of the moving camera for each frame of the plurality of segmented image frames of the object, for example, as described with respect to 306, may be, e.g., a vision based tracking module 174, or may include the external interface 152 that receives (or inertial sensors 158 that provide) inertial sensor data related to the orientation of the source camera while capturing the source video. A for storing the plurality of segmented image frames of the object and the orientation of the moving camera for each frame of the plurality of segmented image frames of the object, for example, as described with respect to 308, may be, e.g., the database 155, which is illustrated as being coupled directly to the bus 163*b*, but may be external to the server 150 if desired. The server 150 may further include means for generating a panoramic image with background in the plurality of source image frames, which may be, e.g., the panoramic imaging generating module 176.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
obtaining a plurality of segmented image frames of an object, a first panoramic image associated with the plurality of segmented image frames of the object, and an orientation of a source camera with respect to the first panoramic image for each frame in the plurality of segmented image frames, the plurality of segmented image frames of the object captured with the source camera;
causing a plurality of target image frames to be captured with a target camera;
generating a second panoramic image from the plurality of target image frames;
determining an orientation of the target camera with respect to the second panoramic image for each frame of the plurality of target image frames;
matching the first panoramic image to the second panoramic image to align the first panoramic image to the second panoramic image;
calculating a transformation for each frame of the plurality of segmented image frames of the object with the first panoramic image aligned to the second panoramic image using the orientation of the source camera with respect to the first panoramic image for each frame in the plurality of segmented image frames and the orientation of the target camera with respect to the second panoramic image for each respective frame in the plurality of target image frames; and
causing the plurality of segmented image frames to be displayed over the plurality of target image frames using the transformation for each frame.

2. The method of claim 1, wherein causing the plurality of segmented image frames to be displayed over the plurality of target image frames using the transformation for each frame spatially registers each frame from of the plurality of segmented image frames of the object with each frame of the plurality of target image frames.

3. The method of claim 1, wherein determining the orientation of the target camera with respect to the second panoramic image for each frame comprises using data from inertial sensors.

4. The method of claim 1, wherein determining the orientation of the target camera with respect to the second panoramic image for each frame comprises using vision based tracking.

5. The method of claim 1, wherein the plurality of segmented image frames of the object and the plurality of target image frames are captured from a same geographical location.

6. The method of claim 1, wherein the transformation for each frame of the plurality of segmented image frames of the object compensates for a difference in position of the source camera and the target camera.

7. The method of claim 1, further comprising:
comparing the first panoramic image and the second panoramic image to determine a lighting difference; and
adjusting the plurality of segmented image frames of the object based on the lighting difference before displaying the plurality of segmented image frames of the object over the plurality of target image frames.

8. The method of claim 1, wherein the orientation of the source camera and the orientation of the target camera are absolute or relative orientations.

9. The method of claim 1, wherein the object in the plurality of segmented image frames is a foreground object or actor or a moving element from a plurality of source frames captured by the source camera and designated by a user.

10. A mobile device comprising:
a camera capable of capturing a plurality of target image frames;
a display capable of displaying the plurality of target image frames; and
a processor coupled to the camera and the display, the processor configured to obtain a plurality of segmented image frames of an object, a first panoramic image associated with the plurality of segmented image frames of the object, and an orientation of a source camera with respect to the first panoramic image for each frame in the plurality of segmented image frames, the plurality of segmented image frames of the object captured with the source camera; generate a second panoramic image from the plurality of target image frames; determine an orientation of the camera with respect to the first panoramic image for each frame of the plurality of target image frames; match the first panoramic image to the second panoramic image to align the first panoramic image to the second panoramic image; calculate a transformation for each frame of the plurality of segmented image frames of the object with the first panoramic image aligned to the second panoramic image using the orientation of the source camera with respect to the first panoramic image and the orientation of the camera with respect to the second panoramic image; and display the plurality of segmented image frames of the object over the plurality of target image frames on the display using the transformation for each frame.

11. The mobile device of claim 10, wherein the processor is configured to display the plurality of segmented image frames of the object over the plurality of target image frames on the display using the transformation for each frame to spatially register the plurality of segmented image frames of the object with the plurality of target image frames.

12. The mobile device of claim 10, further comprising inertial sensors coupled to the processor, wherein the processor is configured to determine the orientation of the camera with respect to the second panoramic image for each frame of the plurality of target image frames using data received from the inertial sensors.

13. The mobile device of claim 10, wherein the processor is configured to determine the orientation of the camera with respect to the second panoramic image for each frame of the plurality of target image frames using vision based tracking with the plurality of target image frames.

14. The mobile device of claim 10, wherein the plurality of segmented image frames of the object and the plurality of target image frames are captured from a same geographical location.

15. The mobile device of claim 10, wherein the transformation for each of the plurality of segmented image frames of the object compensates for a difference in position of the source camera and the camera.

16. The mobile device of claim 10, wherein the processor is further configured to compare the first panoramic image and the second panoramic image to determine a lighting difference, and adjust the plurality of segmented image frames of the object based on the lighting difference before displaying the plurality of segmented image frames of the object over the plurality of target image frames.

17. The mobile device of claim 10, wherein the orientation of the source camera and the orientation of the camera are absolute or relative orientations.

18. The mobile device of claim 10, wherein the object in the plurality of segmented image frames is a foreground object or actor or a moving element from a plurality of source frames captured by the source camera and designated by a user.

19. A mobile device comprising:
means for obtaining a plurality of segmented image frames of an object, a first panoramic image associated with the plurality of segmented image frames of the object, and an orientation of a source camera with respect to the first panoramic image for each frame in the plurality of segmented image frames, the plurality of segmented image frames of the object captured with the source camera;
means for capturing a plurality of target image frames with a target camera;
means for generating a second panoramic image from the plurality of target image frames;
means for determining an orientation of the target camera with respect to the second panoramic image for each frame of the plurality of target image frames;
means for matching the first panoramic image to the second panoramic image to align the first panoramic image to the second panoramic image;
means for calculating a transformation for each frame of the plurality of segmented image frames of the object with the first panoramic image aligned to the second panoramic image using the orientation of the source camera with respect to the first panoramic image and the orientation of the target camera with respect to the second panoramic image; and
means for displaying the plurality of segmented image frames of the object over the plurality of target image frames using the transformation for each frame.

20. The mobile device of claim 19, wherein the means for displaying the plurality of segmented image frames of the object over the plurality of target image frames using the transformation for each frame spatially registers the plurality of segmented image frames of the object with the plurality of target image frames.

21. A non-transitory computer-readable medium including program code stored thereon, comprising:
program code to obtain a plurality of segmented image frames of an object, a first panoramic image associated with the plurality of segmented image frames of the object, and an orientation of a source camera with respect to the first panoramic image for each frame in the plurality of segmented image frames, the plurality of segmented image frames of the object captured with the source camera;
program code to generate a second panoramic image from a plurality of target image frames;
program code to determine an orientation of a target camera with respect to the second panoramic image for each frame of a plurality of target image frames captured with the target camera;
program code to match the first panoramic image to the second panoramic image to align the first panoramic image to the second panoramic image;
program code to calculate a transformation for each frame of the plurality of segmented image frames of the object with the first panoramic image aligned to the second panoramic image using the orientation of the source camera with respect to the first panoramic image and the orientation of the target camera with respect to the second panoramic image; and
program code to display the plurality of segmented image frames of the object over the plurality of target image frames using the transformation.

22. A method comprising:
obtaining a plurality of source image frames including an object and a background that is captured with a moving camera;
segmenting the object from the background in the plurality of source image frames to produce a plurality of segmented image frames of the object;
generating a panoramic image with the background from the plurality of source image frames;

determining an orientation of the moving camera for each frame of the plurality of segmented image frames of the object; and storing the plurality of segmented image frames of the object with the panoramic image and the orientation of the moving camera for each frame of the plurality of segmented image frames of the object.

23. The method of claim 22, wherein segmenting the object comprises separating the object from the background in each frame of the plurality of source image frames.

24. The method of claim 22, further comprising:
capturing a plurality of target image frames;
determining a target camera orientation for each frame of the plurality of target image frames;
calculating a transformation for each frame of the plurality of segmented image frames of the object using the panoramic image, the orientation of the moving camera for each frame of the plurality of segmented image frames and the target camera orientation for each frame of the plurality of target image frames; and
displaying the plurality of segmented image frames of the object over the plurality of target image frames using the transformation for each frame.

25. The method of claim 22, wherein the orientation of the moving camera is an absolute or relative orientation.

26. The method of claim 22, wherein the moving camera is rotating.

27. The method of claim 22, wherein segmenting the object from the plurality of source image frames to produce the plurality of segmented image frames of the object comprises:
identifying the object in a first frame of the plurality of source image frames based on user selection;
segmenting the object from the first frame;
identifying the object in each subsequent frame of the plurality of source image frames based on optical flow using the identification of the object from a proceeding frame of the plurality of source image frames;
segmenting the object from each subsequent frame;
combining the object segmented from the first frame and the object segmented from each subsequent frame to produce the plurality of segmented image frames of the object.

28. The method of claim 22, wherein the object is a foreground object or actor or a moving element from the plurality of source image frames captured by the moving camera and designated by a user.

29. An apparatus comprising:
a database; and
a processor coupled to the database, the processor being configured to obtain a plurality of source image frames including an object an a background that is captured with a moving camera, segment the object from the background in the plurality of source image frames to produce a plurality of segmented image frames of the object; generate a panoramic image with the background from the plurality of source image frames;
determine an orientation of the moving camera for each frame of the plurality of segmented image frames of the object, and store the plurality of segmented image frames of the object with the panoramic image and the orientation of the moving camera for each frame of the plurality of segmented image frames of the object in the database.

30. The apparatus of claim 29, wherein the processor is configured to segment the object from the plurality of source image frames by being configured to separate the object from the background in each frame of the plurality of source image frames.

31. The apparatus of claim 29, wherein the orientation of the moving camera is an absolute or relative orientation.

32. The apparatus of claim 29, wherein the moving camera is rotating.

33. The apparatus of claim 29, wherein the processor is configured to segment the object from the plurality of source image frames to produce the plurality of segmented image frames of the object by being configured to segment the object from a first frame of the plurality of source image frames based on a user identification of the object in the first frame, perform optical flow to identify the object in each subsequent frame of the plurality of source image frames using an identification of the object from a proceeding frame of the plurality of source image frames, segment the object from each subsequent frame, and combine the object segmented from the first frame and the object segmented from each subsequent frame to produce the plurality of segmented image frames of the object.

34. The apparatus of claim 29, wherein the object is a foreground object or actor or a moving element from the plurality of source image frames captured by the moving camera and designated by a user.

35. An apparatus comprising:
means for obtaining a plurality of source image frames including an object and a background that is captured with a moving camera;
means for segmenting the object from the background in the plurality of source image frames to produce a plurality of segmented image frames of the object;
means for generating a panoramic image with the background from the plurality of source image frames;
means for determining an orientation of the moving camera for each frame of the plurality of segmented image frames of the object; and
means for storing the plurality of segmented image frames of the object with the panoramic image and the orientation of the moving camera for each frame of the plurality of segmented image frames of the object.

36. The apparatus of claim 35, wherein the means for segmenting the object separates the object from the background in each frame of the plurality of source image frames.

37. A non-transitory computer-readable medium including program code stored thereon, comprising:
program code to obtain a plurality of source image frames including an object and a background that is captured with a moving camera;
program code to segment the object from the background in the plurality of source image frames to produce a plurality of segmented image frames of the object;
program code to generate a panoramic image with the background from the plurality of source image frames;
program code to determine an orientation of the moving camera for each frame of the plurality of segmented image frames of the object; and
program code to store the plurality of segmented image frames of the object with the panoramic image and the orientation of the moving camera for each frame of the plurality of segmented image frames of the object.

* * * * *